Jan. 26, 1954

H. L. BROCK ET AL 2,667,082

TRANSMISSION CONTROL

Original Filed June 27, 1950

H.L.BROCK
J.R.STEVENSON
INVENTOR.

BY E. C. McRae
J. R. Faulkner
G. H. Oster

ATTORNEYS

Jan. 26, 1954

H. L. BROCK ET AL 2,667,082

TRANSMISSION CONTROL

Original Filed June 27, 1950

H.L. BROCK
J.R. STEVENSON
E.C. McRae
INVENTOR.
BY J.R. Faulkner
J.H. Oster

ATTORNEYS

Jan. 26, 1954

H. L. BROCK ET AL 2,667,082

TRANSMISSION CONTROL

Original Filed June 27, 1950

H.L. BROCK
J.R. STEVENSON
INVENTOR.

BY E.C. McRae
J.R. Faulkner
G.H. Oster

ATTORNEYS

Jan. 26, 1954     H. L. BROCK ET AL     2,667,082
TRANSMISSION CONTROL
Original Filed June 27, 1950     7 Sheets-Sheet 4

H. L. BROCK
J. R. STEVENSON
INVENTOR.

BY *E. C. McRae*
*J. R. Faulkner*
*G. H. Oster*

ATTORNEYS

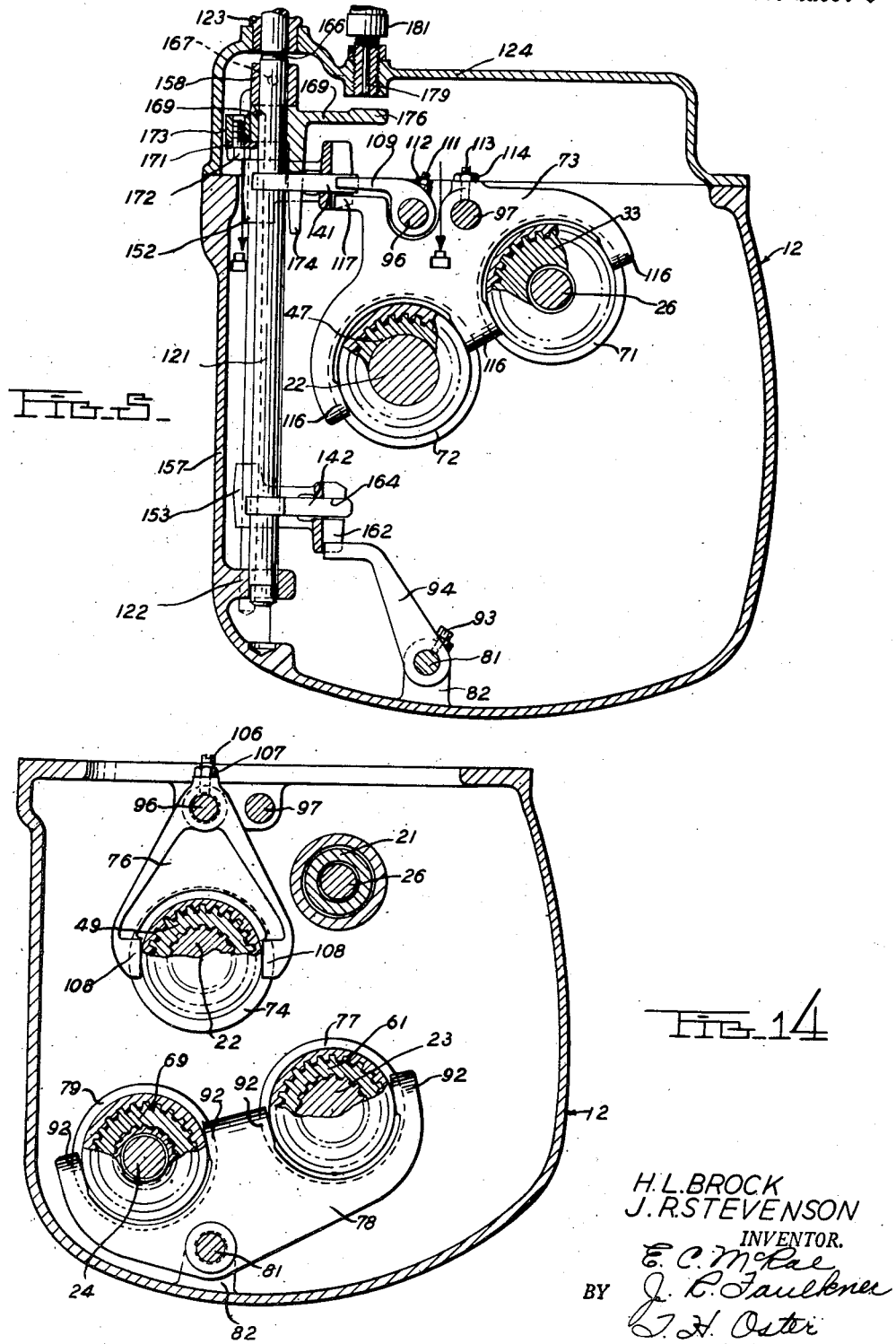

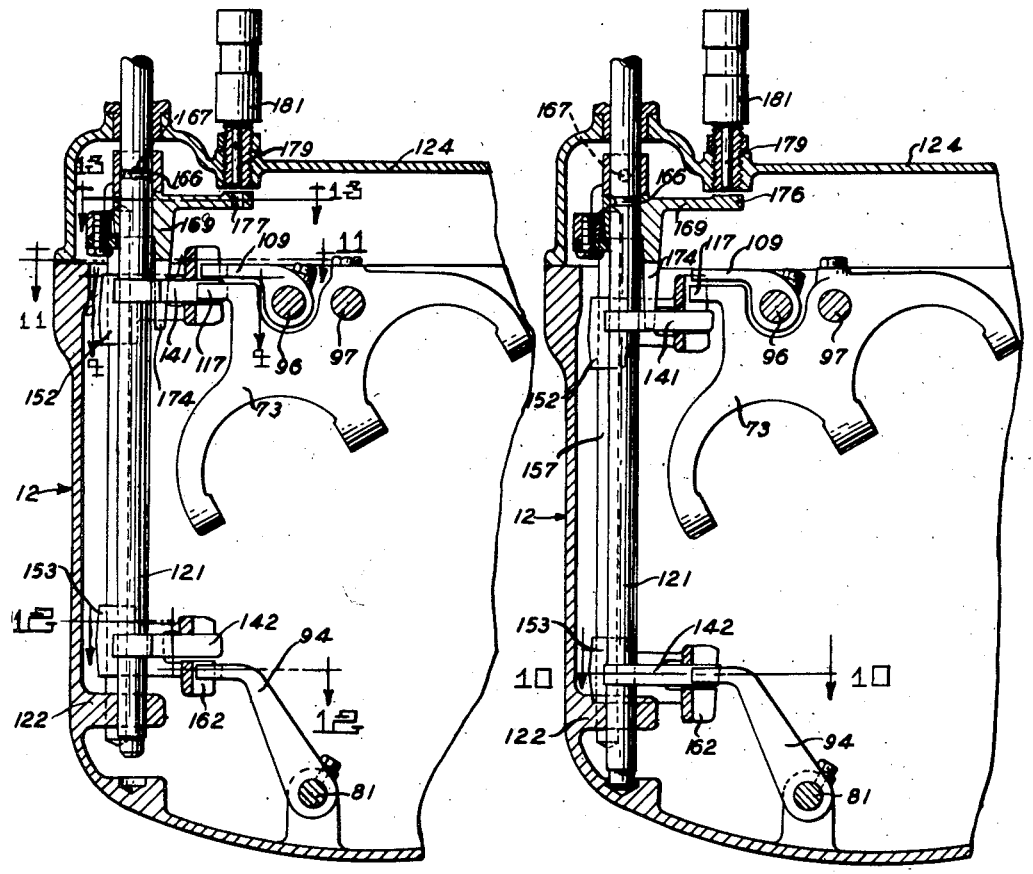

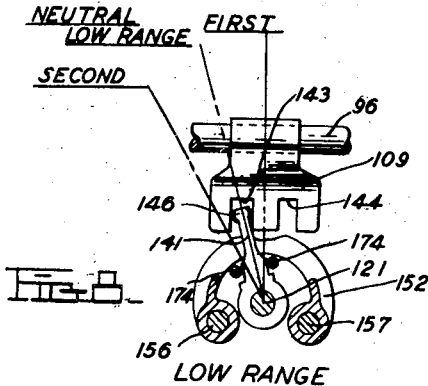
Fig. 8  LOW RANGE
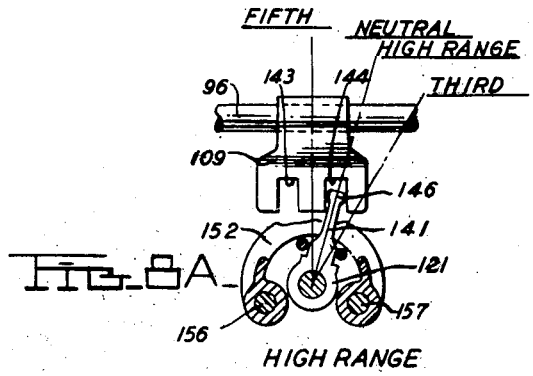
Fig. 8A  HIGH RANGE
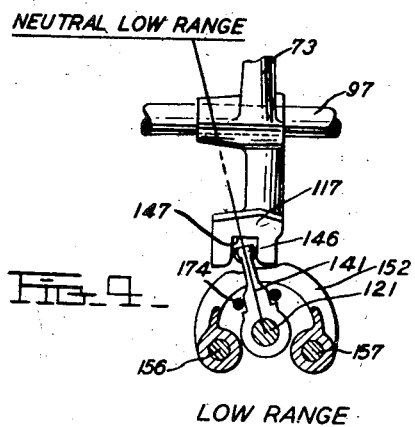
Fig. 9  LOW RANGE
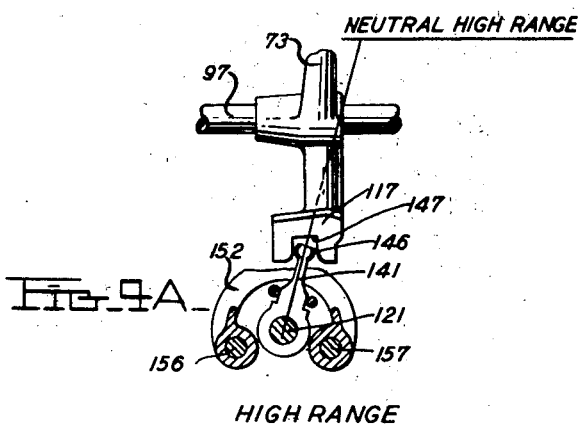
Fig. 9A  HIGH RANGE
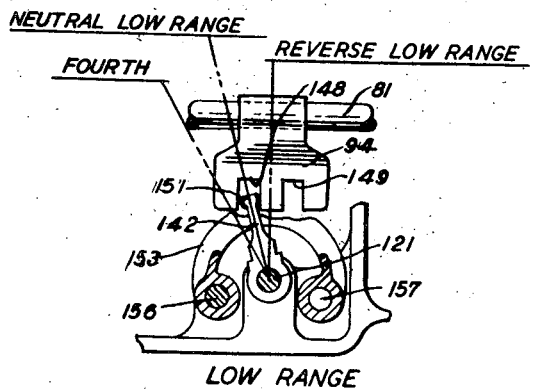
Fig. 10  LOW RANGE
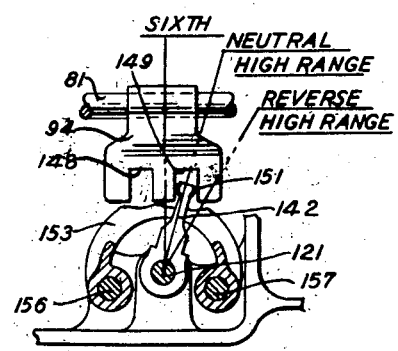
Fig. 10A  HIGH RANGE
H.L. BROCK
J.R. STEVENSON
INVENTOR.
BY E.C. McRae
J.R. Faulkner
J.H. Oster
ATTORNEYS Patented Jan. 26, 1954

2,667,082

UNITED STATES PATENT OFFICE 2,667,082

TRANSMISSION CONTROL

Harold L. Brock, Detroit, and James R. Stevenson, Ann Arbor, Mich., assignors to Ford Motor Company, Dearborn, Mich., a corporation of Delaware Original application June 27, 1950, Serial No. 170,658. Divided and this application November 29, 1951, Serial No. 259,744

7 Claims. (Cl. 74—477)

This invention relates generally to variable speed transmissions for motor vehicles.

The transmission of the present invention is particularly adapted for use in agricultural tractors, and an object of the invention is therefore to provide a transmission having a relatively large number of forward and reverse gear ratios in order that a suitable ratio will be available for each type of tractor operation. It is a further object of the invention to provide a transmission obtaining the necessary speed ratios with a minimum number of gears and with a compact arrangement. In the present construction six forward and two reverse ratios are obtained with a transmission having only eleven gears compactly arranged upon four shafts so that the distances between the bearings for each shaft can be held to a minimum.

Another object of the invention is to provide a transmission in which gear ratios can be obtained for various operational requirements, with the proper steps being provided from a very low or creeping speed to a relatively high road or transport speed. In the present construction the speed ratios are not obtained in the usual manner of a "step" transmission in which, for example, a three speed transmission is provided with a reduction gear which can be inserted in the gear train to give a fixed reduction for each of the three regular speed ratios and thus provide a six speed transmission. While a transmission of this type is easily designed and manufactured, the six speed ratios thus obtained are necessarily in a mathematical progression and are not the proper ratios for the most efficient overall operation. While the present transmission provides two ranges in the shifting pattern, namely a low range and a high range, the ratios in the two ranges are not comparable to those of the usual step transmission, but are designed to provide the proper gear ratios for the various tractor operations. The particular design and arrangement of the gearing makes this possible.

Still another object of the invention is to provide simplified shifting mechanism enabling the transmission to be shifted between the various speed ratios easily and positively with a single gearshift lever.

Another object is to provide a shift pattern of a type generally familiar to the average individual and provided with visual indicating means enabling the tractor driver to tell at a glance the gear ratio the tractor is operating in at the moment and also the shift pattern to follow to reach any other desired speed range.

Yet another object of the invention is to provide a transmission of the type mentioned in which positive interlocking means are provided to automatically hold inoperative the shift mechanism for all ratios other than that selected, and also to provide an interlocking arrangement preventing the engine starter from being applied except when the transmission is in neutral.

The foregoing and other objects of this invention will be made more apparent as this description proceeds, particularly when considered in connection with the accompanying drawings, wherein:

Figure 5 is a transverse vertical cross sectional view taken on the line 5—5 of Figure 4 and showing the shifter shaft in its uppermost position.

Figure 6 is a cross sectional view similar to a portion of Figure 5 but showing the shifter shaft in its intermediate or central position.

Figure 7 is a cross sectional view similar to Figures 5 and 6 but showing the shifter shaft in its lowermost position.

Figure 8 is a horizontal cross sectional view taken on the line 8—8 of Figure 5 showing the upper shift arm in position to shift the transmission between first and second speeds in low range.

Figure 8A is a view similar to Figure 8 but showing the upper shift arm in position to shift the transmission between third and fifth speeds in high range.

Figure 9 is a horizontal cross sectional view taken on the line 9—9 of Figure 6, showing the upper shift arm in position to shift the transmission into low range neutral.

Figure 9A is a view similar to Figure 9 but showing the upper shift arm in position to shift the transmission into high range neutral.

Figure 10 is a horizontal cross sectional view taken on the line 10—10 of Figure 7, showing the lower shift arm in position to shift the transmission between reverse and fourth speed in low range.

Figure 10A is a view similar to Figure 10 but showing the lower shift arm in position to shift the transmission between reverse and sixth speed in high range.

Figure 14 is a transverse cross sectional view through the transmission taken on the line 14—14 of Figure 4.

Figure 15 is a front elevational view of the shift pattern plate.

The following description will deal first with the transmission gearing and next with the gear-shifting and interlocking mechanism.

Transmission gearing

Figure 1:
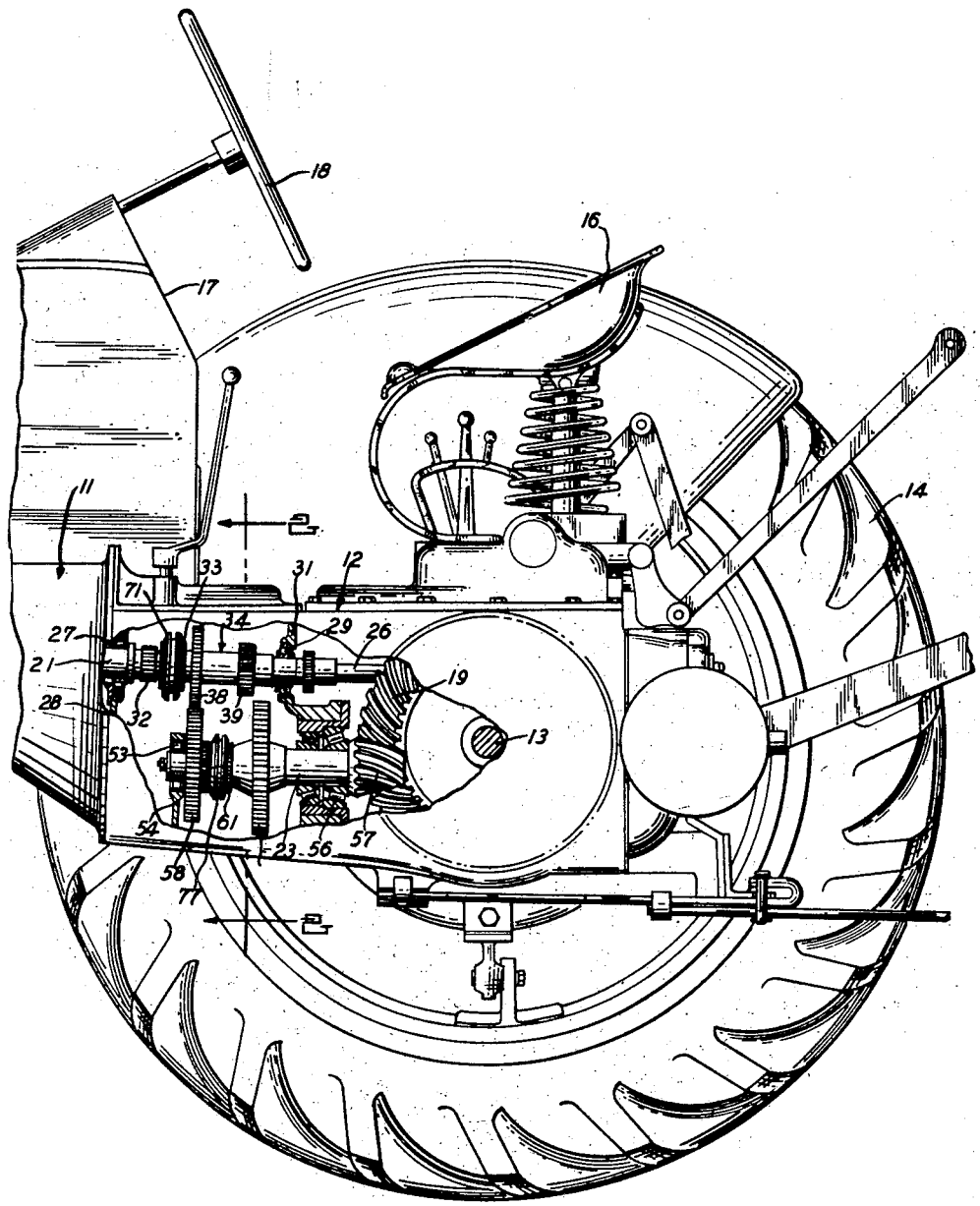
Figure 1 is a side elevational view of the rearward portion of a tractor incorporating the transmission of the present invention, with parts broken away and in section.
Figure 2:
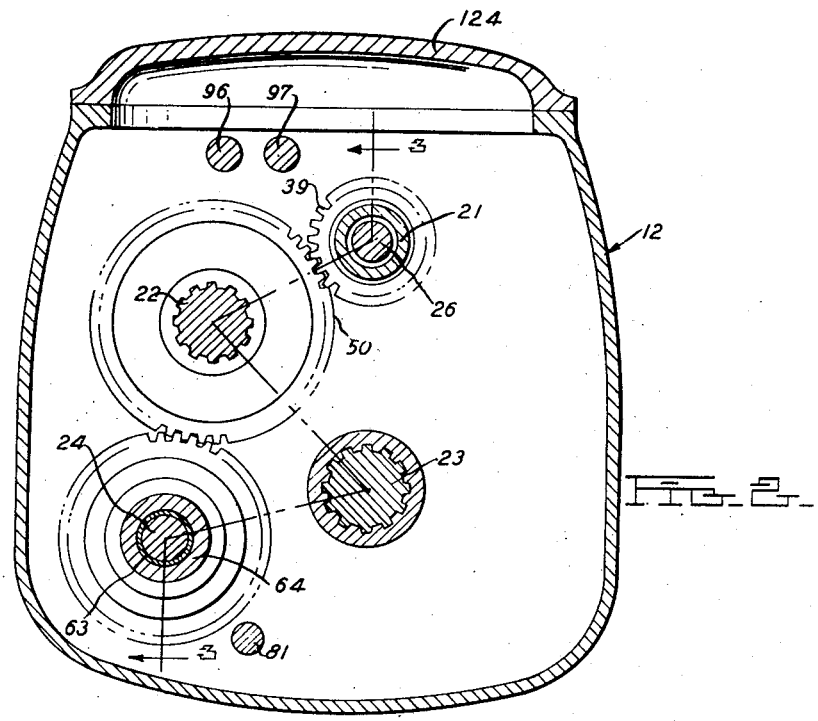
Figure 2 is a transverse cross sectional view taken on the line 2—2 of Figure 1.
Figure 11:
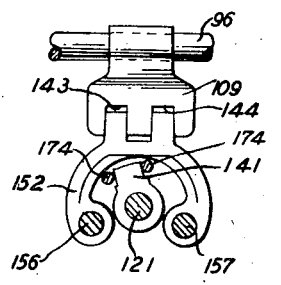
Figure 11 is a vertical cross sectional view taken on the line 11—11 of Figure 6 showing the upper interlock.
Figure 3:
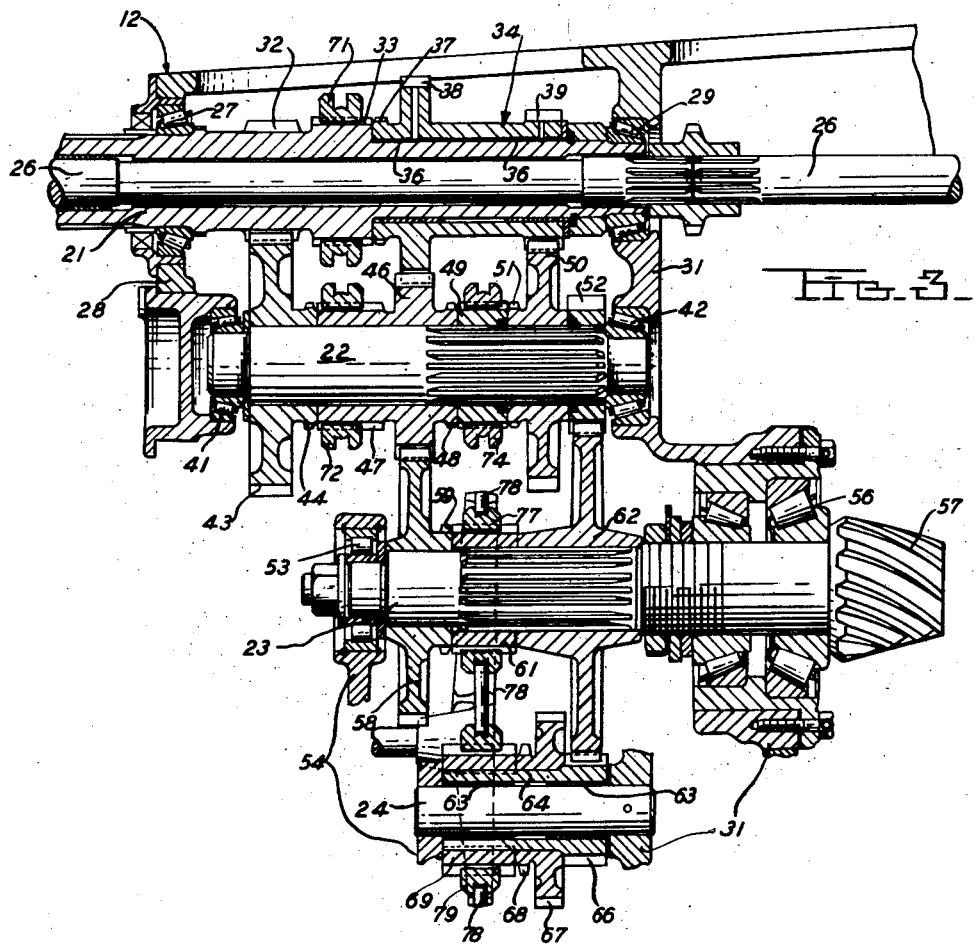
Figure 3 is an expanded cross sectional view of the transmission gearing, and comprises a section taken on the line 3—3 of Figure 2.
Figure 18:
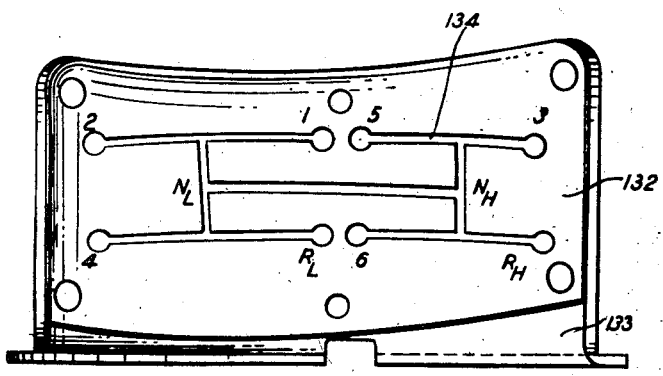

Referring particularly to Figures 1, 2 and 3 of the drawing, the rearward portion of the tractor chassis comprises the clutch housing 11 and a transmission and rear axle housing 12 suitably bolted together. The housing 12 supports a rear axle 13 carrying road wheels 14 at opposite sides of the tractor. A spring supported seat 16 is mounted upon housing 12 rearwardly of the dash 17 and steering wheel 18.

The transmission of the tractor is mounted in the forward portion of the housing 12, and conventional rear axle and differential mechanism, including a ring gear 19 of the hypoid type, are mounted in the rearward portion of the housing.

As best seen in Figures 2 and 3, the transmission includes four longitudinally extending shafts, namely a driveshaft 21, a countershaft 22, a driven shaft 23. and an idler shaft 24. In the present construction the driveshaft 21 is in the form of a sleeve encircling a power takeoff shaft 26 which extends through the transmission to the rearward end of the tractor to provide auxiliary power for driving various implements and the like. For the purposes of this description the sleeve 21 will be termed a driveshaft.

The driveshaft 21 is journaled at its forward end in a bearing 27 supported in the front wall 28 of the housing 12 and the rearward end of the shaft is journaled in a bearing 29 supported in an intermediate wall 31 extending transversely of the housing 12 and integrally formed therewith. The driveshaft 21 has a gear 32 formed integrally thereon near its forward end. Rearwardly of the gear 32 the driveshaft is formed with clutch teeth 33, and rearwardly of the clutch teeth 33 the driveshaft 21 is reduced in diameter and rotatably supports a cluster gear 34 freely rotatable upon the driveshaft by means of bushings 36. The cluster gear 34 has narrow clutch teeth 37 formed at its forward end and is also integrally formed with axially spaced gears 38 and 39.

The countershaft 22 is likewise journaled in bearings 41 and 42 supported in the transverse walls 28 and 31 of the transmission housing. At the forward end of the countershaft 22 a gear 43 is rotatably mounted and has integrally formed therewith narrow clutch teeth 44. Also freely rotatably mounted upon the countershaft 22 is a gear 46. Clutch teeth 47 and 48 are formed integrally with the gear 46 on opposite sides thereof. Rearwardly of the gear 46, a clutch member 49 having gear teeth formed on its periphery is splined to the countershaft 22. A gear 50 having clutch teeth 51 is freely rotatable upon the countershaft 22 rearwardly of the clutch member 49, and adjacent thereto is a gear 52, the latter, however, being splined to the countershaft 22.

The driven shaft 23 is positioned directly beneath the driveshaft 21 but is considerably shorter in length since it supports only two gears and a single clutch member. The driven shaft 23 is journaled at its forward end in a bearing 53 supported in an intermediate transverse wall 54. The wall 54 is integrally formed with the housing 12 and extends transversely across the lower portion of the latter. The rearward portion of the driven shaft 23 extends through and is journaled in bearings 56 supported in an offset portion of the transverse wall 31 of the housing. Rearwardly of the housing wall 31 the driven shaft carries a drive pinion 57 of the hypoid type which meshes with the hypoid gear 19 of the rear axle mechanism. Adjacent the forward end of the driven shaft 23 the shaft rotatably supports a gear 58 having formed integrally therewith narrow clutch teeth 59. A clutch member 61 is splined to the driven shaft 23 adjacent the gear 58, and rearwardly thereof a gear 62 is fixedly splined to the driven shaft.

The lowermost shaft in the transmission housing is the idler shaft 24. This shaft is fixedly mounted in the transmission housing, its forward end being supported in the intermediate wall 54 of the housing and its rearward extremity being supported in and pinned to the wall 31 of the housing. The shaft is thus held against rotation. Rotatably mounted upon the idler shaft 24 by means of bushings 63 is the hub 64 of a gear 66. A second gear 67 is rotatably mounted upon the hub 64 of the gear 63 and is integrally formed with narrow clutch teeth 68. Forwardly of the gear 67 a clutch member 69 is splined to the hub 64 of the gear 63.

Although Figure 3 is an expanded cross sectional view of the transmission gearing, all of the gears are shown in their proper meshing engagement with the exception of gear 50 on countershaft 22 and gear 67 on idler shaft 24. In Figure 3 these two gears are shown spaced from each other, but it will be noted from the transverse cross sectional view of Figure 2 that gears 50 and 67 are actually in constant mesh with each other. Bearing this in mind, Figure 3 can be used to trace the power flow through the transmission gears in the various speed ratios. Before tracing the power flow, however, the function of the various clutches will be briefly described.

Referring first to the clutch on the driveshaft 21, a peripherally grooved clutch ring 71 is provided with internal teeth and is adapted to slide axially on clutch teeth 33 formed on an enlarged portion of the shaft. It will be seen that when clutch ring 71 is shifted rearwardly (to the right in Figure 3) from the position shown in this figure, the clutch ring engages clutch teeth 37 carried by the cluster gear 34 and is effective to lock the cluster gear to the driveshaft 21. With the clutch ring 71 in the position shown in Figure 3, however, the cluster gear is not coupled to the driveshaft.

Referring now to the countershaft 22, a clutch ring 72, when shifted to the left from the position shown in Figure 3, engages the clutch teeth 47 on the gear 46 and the clutch teeth 44 on the gear 43. In this position the gears 43 and 46 are coupled together and rotate as a unit. With the clutch ring 72 in the position shown in Figure 3 the gears 43 and 46 rotate independently of each other and are not coupled together. The clutch rings 71 and 72 are operated in unison by a double fork 73 described more in detail hereinafter.

A similar clutch ring 74 is mounted upon the toothed clutch member 49 for axial sliding movement thereon. In Figure 3 the clutch ring 74 is shown in its central or neutral position. Inasmuch as the clutch member 49 is splined to the countershaft 22, it will be seen that when the clutch ring 74 is shifted forwardly to engage the clutch teeth 48 on the gear 46, the gear 46 will be locked to the countershaft 22. On the other hand, when the clutch ring 74 is shifted rearwardly into engagement with the clutch teeth 51 carried by the gear 50, the gear 50 will be locked to the countershaft 22. The clutch ring 74 is shifted by a fork 76, to be described more in detail later.

With reference now to the driven shaft 23, a clutch ring 77 is slideably mounted upon the periphery of the toothed clutch member 61 and is actuated by a double fork 78. The clutch ring 77 is shown in Figure 3 in its central or neutral position, and it will be seen that when it is shifted forwardly into engagement with the clutch teeth 59 on the gear 58 the latter gear will be coupled to the driven shaft 23.

Attention is now directed to the idler shaft 24. A clutch ring 79 is slideably mounted upon the periphery of the toothed clutch member 69 which in turn is splined to the hub 64 of the gear 66. The clutch ring 79 is adapted to be slideably moved by the double fork 78, and when shifted rearwardly engages clutch teeth 68 on gear 67 to lock gears 66 and 67 together for rotation as a unit.

*Shift pattern*

Referring briefly to the shift pattern shown in Figure 15 it will be noted that the gear ratios are divided between a low range and a high range of speed ratios. The low range includes first, second and fourth speeds forward and a reverse, while the high range includes third, fifth and sixth speeds forward and a reverse.

*Low range—first speed*

Selection between the low and high ranges of speed ratios is effected by actuation of the double fork 73 which simultaneously shifts clutch rings 71 and 72. Shifting the clutch rings to the left in Figure 3 or forwardly of the transmission, causes clutch ring 72 to straddle clutch teeth 44 and 47 and to lock gears 43 and 46 together. For all speeds in the low range, therefore, the power flow begins through gear 32 on the driveshaft 21 and gears 43 and 46 on the countershaft 22. First speed is effected after the transmission has been shifted into low range as previously described, by shifting clutch ring 74 to the right in Figure 3 so that the clutch ring straddles the teeth on the clutch member 49 and the clutch teeth 51 on the gear 50 to lock gear 50 to the countershaft 22.

The power flow in first speed is through the following gears in the order recited: gear 32 carried by driveshaft 21, gear 43 rotatably mounted on countershaft 22, gear 46 coupled to gear 43 by the clutch ring 72, gear 38 of the cluster gear 34 journaled on the driveshaft 21, gear 39 integrally formed with gear 38 on the cluster gear, gear 50 coupled to the countershaft 22 by the clutch ring 74, gear 52 carried by the countershaft 22, and finally gear 62 carried by the driven shaft 23 and thence to the drive pinion 57 and the rear axle assembly. It will be noted that the incorporation of the cluster gear 34 into the gear train in first speed makes it possible to obtain an extremely large reduction. In the present instance a total reduction in first speed of 154 to 1 is obtained, the tractor speed at the normal engine speed of 1500 R. P. M. being 1.5 miles per hour. This affords a "creeping" speed in first gear which may be used when plowing under heavy conditions, or with transplanters, orchard sprayers, and other implements requiring an extremely low speed.

*Low range—second speed*

Second speed is obtained simply by shifting the clutch ring 74 to the left to straddle the clutch teeth on clutch member 49 and clutch teeth 48 on the gear 46. Gear 46 is thus coupled to the countershaft 22 and the power train is the same as in first speed except that the reduction afforded by the cluster gear 34 is omitted. The power flow for second speed is through gears 32, 43, 46, 52 and 62 to the driven shaft 23. A reduction of 64 to 1 is obtained in second speed with a tractor speed of 3.5 miles per hour at 1500 R. P. M. engine speed. This speed is the one most generally used for normal plowing.

*Low range—fourth speed*

The next highest low range speed is fourth, and this is effected by shifting the double fork 78 to the left in Figure 3 to shift clutch ring 77 to interconnect the clutch teeth on clutch member 61 with clutch teeth 59 on gear 58 and to therefore couple gear 58 to the driven shaft 23. The power flow from the driveshaft 21 to the driven shaft 23 for fourth speed is through gears 32, 43, 46, and 58 to the driven shaft 23. Fourth speed gives a reduction of 38 to 1 and a tractor speed of six miles per hour and may be used for extremely light plowing or for tillage where a reasonably fast speed can be used without damage to crops, such as with spike tooth harrows and similar implements.

*Low range—reverse*

Low range also includes a reverse speed reduction of 154 to 1 with a reverse tractor speed of 1.5 miles per hour. This is effected by shifting the double fork 78 to the right in Figure 3 to shift clutch ring 79 to couple together the clutch teeth on clutch member 69 and clutch teeth 68 on gear 67, thus locking gears 66 and 67 together for rotation as a unit. Inasmuch as gear 67 on the idler shaft 24 is in constant mesh with gear 50 on the countershaft 22, it will be seen that this again brings the cluster gear 34 into the power train, the latter comprising the following gears in order: 32, 43, 46, 38, 39, 50, 67, 66, and 62 to the driven shaft 23. It will be seen that an extremely low reverse speed is thus obtained.

*High range—third speed*

The three forward and one reverse speeds available in high range can be readily obtained by first shifting the double fork 73 to the right in Figure 3 to place clutch ring 72 on the countershaft 22 in an inoperative position and at the same time to shift clutch ring 71 on the drive shaft 21 to a position interconnecting clutch teeth 33 on the drive shaft with clutch teeth 37 on the cluster gear 34. The cluster gear 34 is thus directly driven by the drive shaft 21 and inasmuch as the cluster gear carries two gears 38 and 39, a variety of speeds can be obtained by utilizing one or the other of these gears in the power train.

The lowest speed in high range is third, and is effected, with the clutch ring 71 coupling the cluster gear 34 to the drive shaft 21 as described in the preceding paragraph, by shifting clutch ring 74 to the right to connect gear 50 to the countershaft 22 through the clutch member 49. The power flow in third speed is from the drive shaft 21 to the cluster gear 34, thence through gears 39 and 50 to the countershaft 22, and then from gear 52 on the countershaft to gear 62 on the driven shaft 23. The reduction in third speed is 49 to 1 with a tractor speed of 4.5, and this gear ratio is suitable for all plowing of a lighter nature where additional speed can be used.

High range—fifth speed

Shifting clutch ring 74 to the left obtains fifth speed forward by coupling gear 46 to the countershaft 22 through the clutch member 49, in a manner similar to the shift required in second speed of low range. The power flow is again from the drive shaft 21 to the cluster gear 34 but in this instance is from gear 38 of the cluster gear to gear 46, the latter being coupled to the countershaft 22 through the clutch member 49, and finally through gears 52 and 62 to the driven shaft 23. The reduction in fifth is 21 to 1 resulting in a tractor speed at 1500 R. P. M. of 11 miles per hour, which is a suitable speed for road transport of the tractor.

High range—sixth speed

The fastest forward speed, or sixth, is effected by shifting the double fork 76 to the left in Figure 3, to shift clutch ring 77 and couple gear 8 to shaft 23, the power flow now being from drive shaft 21 to the cluster gear 34 and from gear 38 shaft 21 to the cluster gear to gear 46 which freely rotates on the cluster gear to gear 46 which freely rotates about the countershaft 22, and thence to gear 58 now coupled to the driven shaft 23 by the clutch ring 77. Sixth speed gives a total reduction of 12 to 1 and a tractor speed of 18.6 miles per hour, which affords a fast transport speed for driving the tractor on the road without implements.

High range—reverse

A reverse speed is also available in high range, and is effected by shifting the double fork 76 to the right, to shift clutch ring 79 and couple gears 66 and 67 together. The power flow is from drive shaft 21 to the cluster gear 34, as in all high range speeds, and thence through gears 39, 50, 67, 66 and 62 to the driven shaft 23.

It will be understood that the uses of the various gear ratios briefly discussed above are only given by way of example and that various other uses for the particular ratios exist. The six forward gear ratios obtainable with the present tranmission are ideally suited for various tractor operations. The two reverse ratios obtainable, one in low range and the other in high range, simplify gearshifting since a reverse speed is readily obtainable regardless of the particular forward speed in which the tractor is operating. In the majority of instances the low reverse obtainable in low range will be the one to be used when the tractor is operating in a low range forward speed ratio, and the high reverse obtainable in high range will be the most suitable reverse ratio under the circumstances existing when the tractor has been operating in one of the high range forward speed ratios. While this simplifies the gearshifting, obviously, however, either reverse may be obtained at any time.

It will be noted that the various gear ratios briefly discussed above are obtained with a very compact transmission arrangement incorporating only ten gears. Furthermore, relatively heavy loads may be carried since the gears are all mounted upon short shafts with a relatively short distance between bearings.

Shift mechanism

Figure 4:
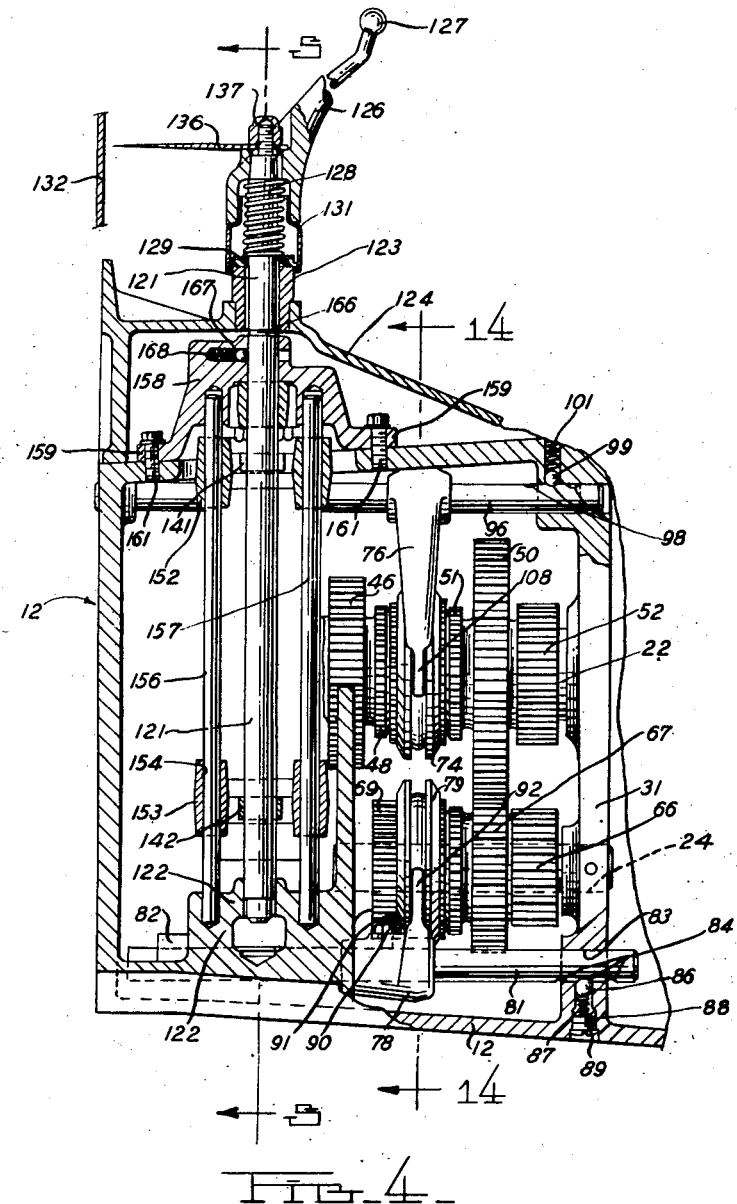
Figure 4 is an enlarged vertical cross sectional view of the transmission taken longitudinally through the transmission housing just inside the left hand side of the latter.

The construction of the shift mechanism for the transmission will be best understood by referring first to Figures 4, 5 and 14. Adjacent the bottom of the transmission housing 12 is a longitudinally extending shifter rail 81 in the form of a rod. At its forward end the shifter rail 81 is slideably mounted in a bracket 82 integrally formed with the transmission housing. At its rearward end the shifter rail extends through an opening 83 in the intermediate wall 31 of the housing. A series of three arcuate grooves 84 are formed in the lower surface of the shifter rail 81 near its rearward end to permit the rail to be indexed in three longitudinally spaced positions. The indexing is accomplished by a ball 86 urged into engagement with the notches 84 by means of a spring 87. The ball 86 and spring 87 are mounted in a bore 88 in the wall 31 of the housing and are held therein by a stud 89.

As best seen in Figures 4 and 14, the double fork 78 is mounted upon the shifter rail 81, being held thereon by a set screw 90 and lock nut 91. The double fork 78 has bifurcated portions 92 which are reduced in thickness and are adapted to be received within the peripheral grooves formed in the clutch rings 77 and 79. It will be apparent that longitudinal movement of the shifter rail 81 is effective through the shifter fork 78 to simultaneously shift the clutch rings 77 and 79 between three positions. The central position places both clutches in neutral, the forward position effects an engagement of clutch ring 77 and the rearward position effects an engagement of clutch ring 79.

Referring now to Figure 5, there is mounted upon the lower shifter rail 81, and held thereon by a set screw 93, a lug 94. The lug 94 is adapted to be alternately engaged by a shifter arm or an interlock bracket to control the longitudinal position of the shifter rail 81 and the shifter fork 78, as will be described more in detail later.

Figure 4A:
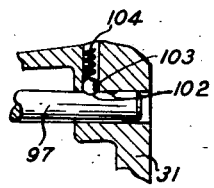
Figure 4A is a fragmentary cross sectional view through the rearward end of shift rail 97.

A pair of longitudinally extending shifter rails 96 and 97 are mounted adjacent the upper portion of the transmission housing 12, the rails being slideable at their opposite ends in the walls 28 and 31 of the transmission housing 12. The rearward end of the shifter rail 96 is formed with a series of three arcuate notches 98 arranged for indexing engagement with a ball 99 held against the rail by a spring 101. As seen in Figures 4A, the rearward end of shifter rail 97 is provided with two longitudinally spaced notches 102 arranged for indexing engagement with a ball 103 urged against the rail by a spring 104.

As shown in Figures 4 and 14, the fork 76 is rigidly mounted upon the shifter rail 96 by means of a set screw 106 and a lock nut 107. The fork 76 has bifurcated portions 108 reduced in thickness and engageable within the peripheral groove formed in shifter ring 74 which in turn is slideably mounted upon the clutch member 49.

Near its forward end the shifter rail 96 carries a shifter lug 109, Figure 5, rigidly mounted thereon by means of a set screw 111 and a lock nut 112. The shifter lug 109 is adapted to be shifted between three longitudinal positions, by means of shifting mechanism to be described later, to shift the clutch ring 74.

Referring now to Figure 5, the shifter rail 97 carries the double shifter fork 73, the latter being secured to the rail by means of a set screw 113 and a lock nut 114. The shifter fork 73 has bifurcated portions 116 reduced in thickness to fit in the peripheral grooves formed on the clutch rings 71 and 72. A laterally projecting lug 117 is integrally formed on the shifter fork 73 and is adapted to be actuated by the shifting mechanism to be described hereinafter to shift the shifter rail 97 and the fork 73 longitudinally between the two index positions shown in Figure 4A. As previously discussed in connection with the transmission gearing, one of these positions places the transmission in low range and the other in high range.

The mechanism for shifting the above-described shifter rails includes a vertically mounted shifter shaft 121 positioned at the left side of the transmission housing 12 at the lower end thereof, as best shown in Figures 4 and 5. At its lower end the shifter shaft 121 is slideably mounted in a boss 122 integrally formed with the lower portion of the transmission casing. At its upper end the shifter shaft 121 extends through a bushing 123 pressed into an opening in the transmission cover 124.

The extreme upper end of the shifter shaft 121 is keyed to a shift lever 126 extending upwardly rearwardly and inwardly toward the driver's position. The upper end of the gearshift lever 126 carries a knob 127 for operation by the driver. The lower portion of the gearshift lever 126 is formed in the shape of an inverted cup and houses the upper end of a coil spring 128 with the upper end of the spring bearing against a shoulder on the gearshift lever and the lower end resting upon a washer 129 seated upon the bushing 123. A sheet metal shield 131 is pressed into the inverted cup shaped portion of the gearshift lever 126 and encloses the upper end of the bushing 123 to protect the assembly from the weather.

It will be apparent from the foregoing that the shifter shaft 121 is mounted in the transmission for rotary movement and also for vertical sliding movement, under the control of the driver through manipulation of the gearshift lever 126. The vertical and rotary position of the shifter shaft 121, and accordingly the gear ratio to which the transmission has been shifted at any time, is indicated on a shift pattern plate 132 shown diagrammatically in Figure 4. As best seen in Figure 15, the plate 132 is riveted to a bracket 133 which in turn is suitably mounted upon the upper surface of the upper transmission housing in position to be viewed by the vehicle operator. The plate 132 has engraved or suitably displayed thereon a shift pattern 134 indicating the six forward speed positions and the two reverse speed positions, as well as the two neutral positions.

Mounted upon the upper end of the shifter shaft 121, Figure 4, is a pointer 136 suitably secured thereon by a nut 137. The forward end of the pointer is positioned closely adjacent the plate 132 and as the gearshift lever 126 and the shifter shaft 121 are moved vertically and angularly between the various indexed positions, the particular position is indicated on the shift pattern 134 by the pointer 136, enabling the operator to not only ascertain the particular speed ratio in which the tractor is operating, but also to determine the movement necessary to shift to any other desired speed ratio.

As best seen in Figure 5, a pair of shifter arms 141 and 142 are suitably welded or brazed to the shifter shaft 121. The arm 141 is adapted to be engaged with the lugs 109 and 117 to shift the upper shifter rails 96 and 97, while the shifter arm 142 is adapted to be engaged with the lug 94 to shift the lower shifter rail 81.

Figures 8 and 8A show the upper shifter arm 141 in engagement with the lug 109 carried by the shifter rail 96. The lug 109 has a pair of notches 143 and 144 adapted to receive the enlarged end portion 146 of the shifter arm 141. Depending upon the angular position of the shifter shaft 121 the arm 141 engages the notch 143 for low range speeds and the notch 144 for high range speeds.

Figures 9 and 9A show the upper arm 141 in engagement with a notch 147 formed in the lug 117 carried by the fork 73. Angular movement of the shifter shaft 121 moves the fork 73 and shifter rail 97 longitudinally between the positions shown in Figures 9 and 9A.

Figures 10 and 10A show the lower shifter arm 142 engaging the lug 94 on the shifter rail 81. The lug 94 has a pair of notches 148 and 149, the former being engaged by the enlarged head 151 of the arm 142 for low range operation and the latter being engaged by the arm for high range operation.

To prevent the forks and lugs from being inadvertently shifted from their neutral positions while one particular fork and lug is being moved by the adjacent shifter arm, upper and lower interlock brackets 152 and 153 are provided. These two brackets are identical in construction, and differ only in that they are inverted during assembly. Consequently only one will be described in detail.

Figure 12:
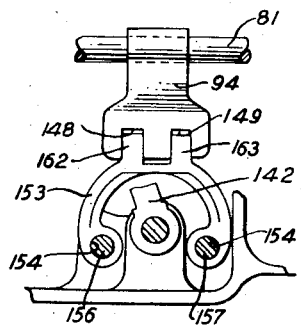
Figure 12 is a horizontal cross sectional view taken on the line 12—12 of Figure 6, showing the lower interlock.

The lower bracket 153 is best shown in Figures 4, 5 and 12, and comprises a crescent shaped member having parallel bores 154 formed in its bifurcated end portions. The bores 154 in the bifurcated end portions of the interlock brackets slideably receive rods 156 and 157 vertically mounted in the transmission housing. The lower ends of the rods are seated in the boss 122 integrally formed with the transmission casing 12 while the upper ends are received within bores formed in a bracket 158. The bracket 158 has legs 159 secured to the upper flange of the transmission casing 12 by means of bolts 161. As best seen in Figure 12, the intermediate portion of the interlock bracket 153 is formed with a pair of flanges 162 and 163 adapted to be engaged within the notches 148 and 149 formed in the lug 94 carried on the shifter rail 81. With the interlock bracket 153 and the lug 94 thus engaged, longitudinal movement of the shifter rail 81 and the fork 78 carried thereby is prevented.

Referring now to Figure 5 it will be seen that the inwardly projecting intermediate portion of the interlock bracket 153 is formed with a groove 164 through which the shifter arm 142 extends. The separated portions of the flanges 162 and 163 thus straddle the shifter arm 142. Inasmuch as the shifter arm 142 is secured to the vertical shifter shaft 121, vertical movement of the shaft results in corresponding vertical movement of the interlock bracket 153, the latter freely sliding on the rods 156 and 157.

As previously mentioned, the upper interlock bracket 152 is identical in construction to the lower bracket 153 but is mounted in inverted position, and straddles the shifter arm 141. The upper end of the shifter shaft 121 is provided with an annular groove 166 arranged to be indexed by a ball 167 urged against the shaft by a spring 168. Engagement between the ball 167 and the groove 166 is effected when the shaft is in its central position at which time the transmission is in neutral.

In addition to providing interlock mechanism effective to prevent the transmission from being shifted inadvertently, means are provided for preventing the starter from being actuated except when the transmission is in neutral. This means comprises a starter interlock bracket 169 having a hub encircling the shifter shaft 121. The bracket 169 is positioned longitudinally of the shaft between the upper portion of the bracket 158 and a retaining plate 171 held by means of bolts 72 adjacent the lower portion of outwardly extending integral flanges 173 of the bracket 158. While the starter interlock bracket 169 is freely rotatably mounted on the shifter shaft 121, it is constrained to move angularly with the shaft by means of downwardly extending bifurcations 174 straddling an intermediate portion of the upper shifter arm 141.

Figure 13:
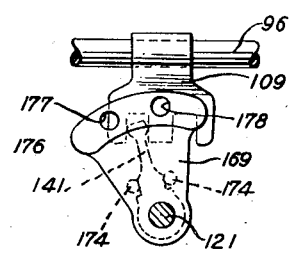
Figure 13 is a horizontal cross sectional view taken on the line 13—13 of Figure 6, showing the starter interlock.

Also integrally formed with the starter interlock bracket 169 is a horizontally extending flange 176 best seen in Figure 13 as being quadrant shaped. The flange 176 is provided with a pair of angularly spaced holes 177 and 178 suitably positioned for engagement with a downwardly projecting pin 179 of a starter button 181 when the transmission is in neutral. Inasmuch as the transmission has two indexed neutral positions, one for low range and another for high range, the two holes 177 and 178 are necessary to permit the starter to be actuated when the transmission is in neutral, low range, and also when it is in neutral, high range. At all other times the flange 176 of the interlock bracket 169 prevents depression of the starter button 181 by intercepting the movement of the pin 179, thus preventing the starter from being operated except when the transmission is in neutral and the drive to the rear wheels disconnected.

Shift mechanism—operation

As previously mentioned, the shifter shaft 121 is adapted to be reciprocated vertically and also moved angularly by manipulation of the gearshift lever 126 by the driver. The shaft may be reciprocated vertically between three positions. Figures 5, 6, and 7 respectively show the upper, central, and lowermost positions of the vertical shifter shaft 121. Reference is first made to Figure 6, showing the central position of the vertical shifter shaft, in which position the index ball 169 is in engagement with the annular groove 166 formed in the upper portion of the shaft. The engagement between the ball and groove is sufficient to hold the shaft in this position, and to overcome the tendency of the spring 128 at the upper end of the shaft to shift the shaft upwardly. Referring to Figures 9 and 9A as well as to Figure 6, when the shifter shaft 121 is in its central or neutral position the upper arm 141 engages the notch 147 in the lug 117 carried by the double fork 73. At this time the lever 126 can be manipulated to move the shifter shaft 121 angularly. Movement in a counterclockwise direction shifts the shifter rail 97 forwardly of the transmission to the position shown in Figure 9, while angular movement in a clockwise direction shifts the fork and rail rearwardly to the position shown in Figure 9A. These two positions are indexed by means of the notches 102 and balls 103 arranged at the rearward end of the rail 97 as shown in Figure 4A. In the position shown in Figure 9 the shifter shaft 121 is located in its neutral position for low range operation while in the position shown in Figure 9A the shaft is positioned in neutral position for high range operation. These positions are suitably indicated upon the shift pattern 134, Figure 15, by the pointer 136, and bear the indices $N_L$ for neutral, low range, and $N_H$ for neutral, high range.

With the vertical shifter shaft 121 in its central or neutral position, as shown in Figure 6, and with the transmission thus in either neutral, low range, or neutral, high range, it is desirable to prevent inadvertent shifting of the shifter rails 96 and 81. This is accomplished by the upper and lower interlock brackets 152 and 153 respectively which engage the lugs 109 and 94 mounted upon the shifter rails 96 and 81 respectively. Inasmuch as the non-rotatable interlock brackets 152 and 153 are engaged respectively with the lugs 109 and 94, inadvertent operation of the rails 96 and 81 is prevented.

From the neutral position shown in Figures 9 and 9A, the transmission may be shifted to first and second speeds in low range and to third and fifth speeds in high range by shifting the vertical shifter shaft upwardly to its uppermost position and then rotating it either clockwise or counterclockwise depending upon the particular speed range desired. Reference is made to Figure 5 and to Figures 8 and 8A showing the uppermost position of the shifter shaft. In the uppermost position the upper shifter arm 141 engages either the notch 143 or the notch 144 in the lug 109 on the shifter rail 96 depending upon whether the transmission is being shifted from neutral, low range or neutral, high range.

Figure 8 shows the position for neutral, low range, and it will be seen that subsequent angular movement of the gearshift lever and the shifter shaft 121 from the neutral position effects various speed ranges. With the shifter shaft and the upper shift arm 141 in neutral, low range, Figure 8, clockwise movement of the shaft is effective to shift the shifter rail 96 rearwardly to place the transmission in first speed, while movement in a counterclockwise direction from the neutral position is effective to shift the shifter rail forwardly and to shift the transmission into second speed. Inasmuch as the manner in which the particular clutches are actuated by the shifter rails has been described in detail hereinbefore, no attempt will be made to duplicate this description at this time.

As seen in Figure 8A, in neutral, high range, the shifter arm 141 engages the notch 144 in the lug 109 on the shifter rail 96. Clockwise movement of the shifter shaft 121 is effective to shift the transmission into third speed while counterclockwise movement of the shaft shifts the transmission into fifth speed in the manner more fully described earlier in the specification.

It will be noted from Figure 5 that with the shifter shaft 121 in its uppermost position the interlock brackets 152 and 153 are in engagement with the lugs 117 and 94 respectively to hold the shifter rails 97 and 81 against inadvertent movement.

Reference is now made to Figure 7 which shows the shifter shaft 121 in its lower position. In this position the upper interlock bracket 152 engages the upper lugs 109 and 117 to prevent inadvertent shifting of the shifter shafts 96 and 97 respectively. The lower shift arm 142 engages the lug 94 to permit the lower shifter rail 81 to be shifted longitudinally upon rotary movement of the shifter shaft. Figure 10 shows the angular position of the shifter shaft 121 and the arm 142 for neutral, low range, with the end 151 of the arm in engagement with the notch 148 of the lug 94 on the shifter rail 81. It will be apparent that clockwise movement of the shaft and arm shifts the transmission to reverse, low range, while counterclockwise movement from the neutral position shifts the transmission to fourth speed forward.

Figure 10A shows the shifter shaft 121 and lower arm 142 in position for neutral, high range, with the end of the arm in engagement with the notch 149 of the lug. From this position the transmission may be shifted into reverse, high range, by clockwise movement of the shaft and into sixth speed forward by counterclockwise movement of the shaft.

As previously mentioned the various gear ratios are indicated in Figure 15 upon the shift pattern 134 and it will be apparent that the driver can readily select the particular ratio desired and make the necessary shift by reciprocating the gearshift lever vertically and rotating it until the pointer 136 is directed toward the desired index. It will be seen that the shift mechanism is compactly located at one side of the transmission housing and contains a minimum of parts, and furthermore that the interlock mechanism automatically permits one shifter rail to be shifted while preventing movement of the other two shifter rails so that operation of the transmission will be positive at all times.

We claim:

1. In a variable speed power transmission having a transmission housing containing a drive shaft, a countershaft, an idler shaft and a driven shaft with inter-meshing gears on said shafts and clutch means arranged to selectively couple certain of said gears to each other and to said shafts to obtain various gear ratios between said drive and driven shafts, the combination of vertically spaced horizontally extending shifter rails mounted in said housing, reciprocable forks on said rails engaging said clutch means to operate the latter, a vertically extending shifter shaft mounted in said housing for vertical reciprocation and also for angular movement, a manually operable lever connected to said vertical shifter shaft to operate the latter, a lug carried by each of said shifter rails and extending toward said vertical shifter shaft, each of said lugs having a pair of axially spaced slots formed therein, and shifter arms carried by said vertical shifter shaft, said arms being selectively engageable with the slots in said lugs to shift said rails between different operating positions.

2. The structure defined by claim 1 which is further characterized in that said arms and lugs are arranged so that in one vertical position of said vertical shifter shaft one arm is in engagement with its respective lug while the other arm is vertically spaced from its respective lug and so that in a second vertical position of said shifter shaft the second arm is in engagement with its respective lug while the first arm is vertically spaced from its respective lug, and interlock mechanism movable with said vertical shifter shaft, said interlock mechanism being arranged to selectively hold each of said lugs against inadvertent reciprocation while the other lug is being operated by its respective shifter arm.

3. The structure defined by claim 1 which is further characterized in that an interlock bracket is associated with each of said shifter arms and is mounted for vertical reciprocation therewith as the shifter shaft is moved between different vertical positions, guide means within said housing supporting said interlock mechanisms and permitting vertical movement of the latter while preventing angular movement thereof, said interlock mechanisms being selectively engageable with the shifter lugs to prevent inadvertent reciprocation of the latter except when the lugs are engaged by said shifter arms.

4. The structure defined by claim 1 which is further characterized in that a starter button is mounted upon said housing and has a pin projecting downwardly therefrom, a starter interlock bracket mounted in said housing for angular movement with said vertical shifter shaft, said starter interlock bracket having a flange provided with a pair of angularly spaced openings therein, said openings being arranged in such manner as to be in alignment with said pin when the shaft is in the proper angular position to permit engagement between the shifter arms and either of the slots formed in the lugs carried by the shifter rails, the flange on said starter interlock bracket blocking movement of said pin and preventing operation of the starter button in all other angular positions of the shifter shaft so that said starter button can be operated only when the transmission is in either of its two neutral positions.

5. In a variable speed power transmission having a transmission housing containing a drive shaft, a countershaft, an idler shaft and a driven shaft and inter-meshing gears on said shafts and clutch means arranged to selectively couple certain of said gears to each other and to said shafts to obtain various gear ratios between said drive and driven shafts, the combination of three horizontally extending shifter rails reciprocably mounted in said housing, forks carried by said shifter rails engageable with said clutch means respectively to operate the latter, three vertically spaced lugs carried respectively by said shifter rails, a vertically extending shifter shaft mounted in said housing for vertical reciprocation as well as for angular movement, shifter arms carried by said shifter shaft and engageable with slots formed in said lugs, a manually operable lever for shifting said vertical shifter shaft between three vertically spaced positions, one of said shifter arms being engageable with one of said lugs in the central position of said shifter shaft and effective upon angular movement of said shifter shaft to reciprocate said last-mentioned lug between two positions each operable to place said transmission gearing in neutral, another of said shifter arms upon movement of said shifter shaft to its uppermost position being engageable with another of said lugs in one of two slots formed therein depending upon the angular position of said shifter shaft and effective upon further angular movement of said shifter shaft to reciprocate said last-mentioned lug and effect a plurality of various gear ratios, and the other of said shifter arms upon movement of said shifter shaft to its lowermost position being engageable with another of said lugs in one of two slots formed therein depending upon the angular position of said shifter shaft and effective upon further angular movement of said shifter shaft to effect various other gear ratios.

6. The structure defined by claim 5 which is further characterized in that interlocking means are mounted within said housing for vertical reciprocation with said shifter arms to selectively engage said lugs and prevent operation of two of said lugs while the third lug is being operated by its respective shifter arm.

7. In a variable speed power transmission having a transmission housing containing a drive shaft, a countershaft, an idler shaft and a driven shaft with intermeshing gears on said shafts and with first clutch means on said drivershaft and second and third clutch means on said countershaft, said intermeshing gears including a cluster gear on said drive shaft and first, second and third gears on said countershaft, the combination of a pair of shifter rails mounted in said housing, a double fork mounted upon one of said rails for reciprocation and engageable with said first and third-mentioned clutch means to simultaneously shift the latter, a second fork mounted upon the other of said shifter rails for reciprocation and engageable with the second-mentioned clutch means to shift the latter, a manually operable shifter shaft mounted in said housing for reciprocation and also for angular movement, a shifter arm carried by said shaft and operatively engageable with means carried by said shifter rail in one axial position of said shifter shaft, angular movement of said shifter shaft between two angular positions when the shifter shaft is in the last-mentioned axial position being effective to shift said double fork and said first and third-mentioned clutch means between one position in which said first-mentioned clutch means connects said cluster gear to said drivershaft and a second position in which said third-mentioned clutch means connects the first and second gears of said countershaft together, and said shifter arm being engageable with means carried by the other of said shifter rails when said shifter shaft has been axially moved from its first-mentioned position, further angular movement of said shifter shaft when in the latter position being effective to operate said second-mentioned clutch means to selectively connect either said second or said third gear on said countershaft to said countershaft.

HAROLD L. BROCK.
JAMES R. STEVENSON.

References Cited in the file of this patent
UNITED STATES PATENTS

| Number | Name | Date |
|---|---|---|
| 2,515,710 | Holmes | July 18, 1950 |
| 2,521,312 | Siekmann | Sept. 5, 1950 |
| 2,569,341 | Schjolin | Sept. 25, 1951 |